J. B. GATHRIGHT.
BOY'S RUNABOUT.
APPLICATION FILED FEB. 12, 1917.
1,263,224.
Patented Apr. 16, 1918.
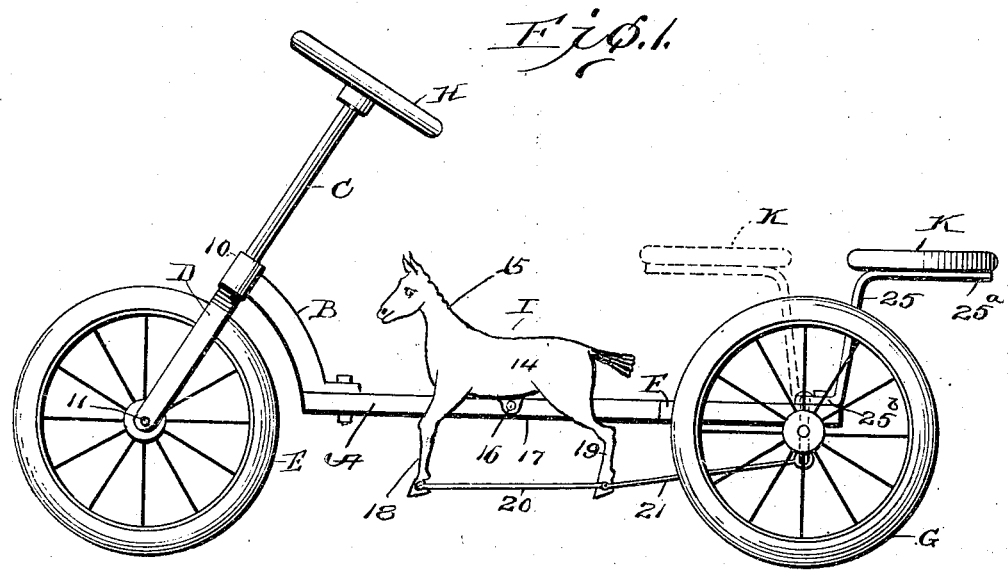
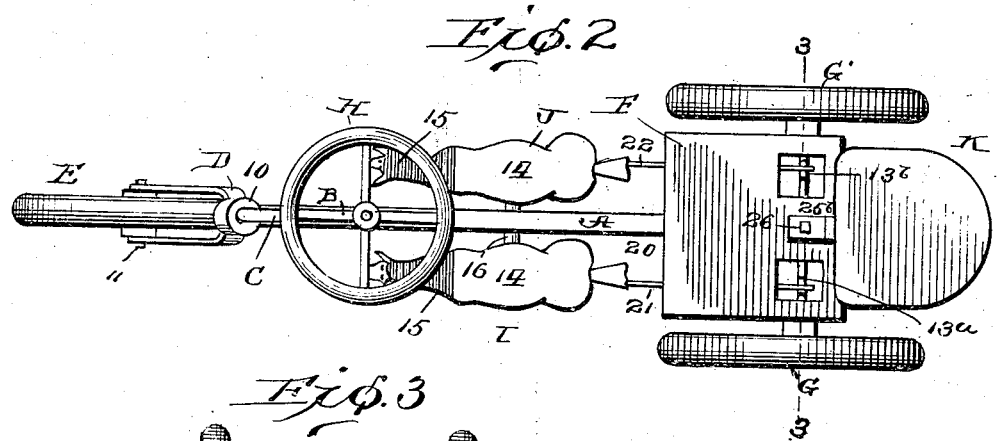
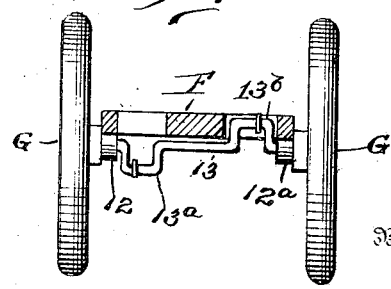
Inventor
J. B. Gathright
By C. J. Stockman
Attorney

UNITED STATES PATENT OFFICE.

JOSIAH B. GATHRIGHT, OF LOUISVILLE, KENTUCKY.

BOY'S RUNABOUT.

1,263,224.  Specification of Letters Patent.  Patented Apr. 16, 1918.

Application filed February 12, 1917. Serial No. 148,072.

*To all whom it may concern:*

Be it known that I, JOSIAH B. GATHRIGHT, a citizen of the United States, residing at Louisville, in the county of Jefferson and State of Kentucky, have invented certain new and useful Improvements in Boys' Runabouts, of which the following is a specification.

This invention relates to improvements in pedal-propelled vehicles, as boys' runabouts for example, and has for one of its most important objects the provision of a pedal-propelled vehicle of simple, durable and inexpensive construction which will have certain new and useful features of a nature such as to commend the vehicle as a means for recreation, for exercise and to teach dexterity in balancing. Another of the important objects of the invention is to provide a pedal-propelled boys' runabout or the like whose pedals simulate animals of suitable selected kind, as horses for example, and are so mounted and connected with the driving wheels that when in motion they present a galloping appearance. A third important object of the invention is to provide a pedal-propelled vehicle of the kind hereinbefore set forth with a seat which is adjustable to accommodate the operator when in one position and a passenger when in another position.

These several objects of the invention are well accomplished by the construction illustrated in the accompanying drawings, in which:

Figure 1 is a side elevation of a runabout embodying the invention.

Fig. 2 is a top plan view of the runabout; and

Fig. 3 is a cross section on the line 3—3 of Fig. 2.

Similar characters of reference denote corresponding parts in the several views.

The vehicle body includes a suitable longitudinal member A, the forward end of which has a support B for a bearing 10. A steering post C is journaled in the bearing 10 and has at its lower end a fork D whose lower extremities suitably support the axle 11 of a steering wheel E. The rear end of the member A is preferably provided with a platform F which carries bearings 12, 12ª in which the opposite ends of an axle 13 are journaled. This axle 13 has crank portions 13ª, 13ᵇ which are offset from each other. Driving wheels G, G' are on the ends of the axle 13. The bearing-support B is suitably secured to the front end of the member A and extends forward and upward therefrom. The bearing 10 is secured to the upper end of this support and is preferably arranged at an inclination, as shown. The upper end of the steering post C has a suitable device, as the steering wheel H for example, for convenience in turning it to steer the vehicle.

I and J represent the pedals, each of which comprises a body 14 and an upwardly and forwardly inclined roughened forward end 15. These pedals are pivoted upon a suitable support or supports, as the stationary transverse shaft 16 which extends in opposite directions from the frame-member A, for example. The bearing of one pedal upon the shaft 16 is shown at 17 in Fig. 1, and it will be understood that the other pedal has a like bearing upon the shaft. The pedals also have depending portions, which have suitable driving connections with the driving wheels G, G', said driving connections preferably comprising the axle 13 and one or more pitmen connecting the pedals with the respective crank portions of the axle.

In the form of the device, herein exemplified, the crank portion 13ª of the axle is connected with a rear depending member 19 of the pedal I by a pitman 21 which is pivotally connected to said member at 19', and a similar pitman 22 connects the crank portion 13ᵇ of the axle with the corresponding depending member of the pedal J. When this construction is employed it may be advisable, though not essential, to connect the front depending members of the respective pedals with the rear members thereof by braces, one of said braces being shown at 20 in Fig. 1 as connecting the members 18 and 19 of the near pedal.

It will be noted that in operation the pedals are rocked upon fixed fulcrums disposed intermediate their front and rear ends and that they have portions above their fulcra to be engaged by the feet of the operator, and downwardly extending portions by which they are connected by suitable power transmitting devices with the driving wheels G, G. It will also be noted that the correlation of the parts of the pedals is such that each pedal may be given the form and appearance of a four-footed animal (a horse, preferably) which appears to be galloping when the pedals are rocked upon their bearings. In such case, the bodies of the animals are engaged by the feet of the operator and are adequate to sustain the weight of the latter when he is driving in a standing position. A desirable way to use these pedals is for the operator to engage the portions 15 thereof with his feet, said portions simulating necks and the roughened portions thereof preventing slipping of the feet and being in practice preferably painted and formed to represent the manes of the animals, and the depending portions to which the pitmen are connected representing certain legs and feet of the animals.

As hereinbefore implied, the operator may propel the vehicle by standing upon the pedals and rocking the same, and it will be apparent that in such case the muscles of the legs, feet and body are brought into play. Again, it will be noted that practice will not only increase the muscular development of the operator, but will also train him in balancing himself upon the pedals and in the application of the power to the best advantage. And, further, it will be seen that by making the pedals in the form of horses, or the like, so mounted as to present the appearance of galloping when in use, the pleasure of the boy who is operating the vehicle, is materially increased.

While it is preferred to propel the vehicle by standing upon the pedals, or partly thereon, yet a seat is provided, as shown at K. This seat may be employed either for the operator or for a passenger. The one here shown is shown as adjustable, and is so mounted that in one position (the full line position shown) it is entirely out of the way of the operator standing upon the pedals and serves for a passenger; and in another position (the dotted position shown in Fig. 1) it is so disposed with relation to the pedals and steering wheel, that the operator may sit upon it while propelling and steering the vehicle. The seat shown is mounted upon a support 25 having an angular portion 25ᵃ at its top to engage the seat and another angular portion, 25ᵇ, at its bottom, the latter extending oppositely to the portion 25ᵃ and being suitably pivoted, as by the pivot bolt 26, to the frame or body of the vehicle.

While I have illustrated and herein set forth in detail an embodiment of the present invention well adapted to carry the several purposes in view into practice in a most satisfactory way, yet I would have it understood that this embodiment is merely exemplary and that changes in the details may be made and the invention otherwise and variously embodied without departing from its spirit or the scope of the subjoined claims.

Having now described the invention, what I believe to be new and desire to secure by Letters Patent, and what I therefore claim, is:—

1. A boy's runabout, comprising, in combination, a frame, driving wheels, a guiding wheel, a pair of pedals and driving connections between the pedals and the driving wheels, each of said pedals having a form simulating an animal and being mounted to have rocking movement relatively to the frame, to give the appearance of galloping when in motion.

2. A boy's runabout, comprising, in combination, a frame, driving wheels, a guiding wheel, a pair of rocking pedals and driving connections between the pedals and the driving wheels, each of said pedals having a form simulating an animal and comprising a body pivotally connected below its upper surface and between its front and rear ends to the frame and having an upwardly projecting forward end and depending legs at its front and rear, the driving connection being connected to appropriate legs.

3. A boy's runabout, comprising, in combination, a frame, driving wheels, an axle connected to said wheels and having a pair of cranks between its ends, a guiding wheel, a pair of rocking pedals each resembling an animal with depending legs, and pitmen connecting a leg of each pedal with the cranks on the axle, respectively.

4. A boy's runabout, comprising, in combination, a frame, driving wheels, an axle connected to said wheels and having a pair of cranks between its ends, a guiding wheel, a pair of rocking pedals each resembling an animal; an upwardly projecting forward portion to be engaged by the forward part of the foot of the operator, and depending front and rear legs, and pitmen connecting a leg of each pedal with the cranks on the axle, respectively.

5. A boy's runabout, comprising, in combination, a frame, rear driving wheels, a front guiding wheel, pedals mounted to have rocking movement and upon which the operator may stand while propelling the runabout, driving connections between the pedals and driving wheels, and a seat mounted to be adjustable toward the pedals to accommodate the operator and away from the pedals to be out of the way of the operator and to accommodate a passenger.

In testimony whereof I affix my signature.

JOSIAH B. GATHRIGHT.